United States Patent
Bonneau et al.

(10) Patent No.: US 6,576,037 B1
(45) Date of Patent: Jun. 10, 2003

(54) METAL MICROPOWDERS BASED ON TUNGSTEN AND/OR MOLYBDENUM AND 3D TRANSITION METALS

(75) Inventors: Maxime Bonneau, Le Fontanil (FR); Jean-Francois Lartigue, La Tronche (FR); Jean Maniak, Grenoble (FR)

(73) Assignee: Eurotungstene Poudres, Grenoble (FR)

( * ) Notice: Subject to any disclaimer, the term of this patent is extended or adjusted under 35 U.S.C. 154(b) by 0 days.

(21) Appl. No.: 09/581,640

(22) PCT Filed: Oct. 15, 1999

(86) PCT No.: PCT/FR99/02518

§ 371 (c)(1),
(2), (4) Date: Sep. 13, 2000

(87) PCT Pub. No.: WO00/23630

PCT Pub. Date: Apr. 27, 2000

(30) Foreign Application Priority Data

Oct. 16, 1998 (FR) .............................................. 98 13032

(51) Int. Cl.⁷ ............................... B22F 3/00; B22F 1/00
(52) U.S. Cl. ............................... 75/246; 75/255; 75/248
(58) Field of Search ........................... 75/255, 248, 246

(56) References Cited

U.S. PATENT DOCUMENTS

| 3,241,949 | A | * | 3/1966 | Kunda |
| 3,418,103 | A | * | 12/1968 | Lasdon |
| 4,765,951 | A | * | 8/1988 | Kemp, Jr. ..................... 419/47 |
| 4,787,934 | A | * | 11/1988 | Johnson et al. |
| 4,885,028 | A | * | 12/1989 | Kopatz et al. |
| 4,913,731 | A |   | 4/1990 | Kopatz et al. |
| 5,112,388 | A |   | 5/1992 | Schultz et al. |
| 5,439,638 | A | * | 8/1995 | Houck et al. .................. 419/30 |
| 5,632,824 | A | * | 5/1997 | Grenthe et al. ............. 148/237 |
| 5,658,395 | A | * | 8/1997 | Wahlberg et al. ........... 148/237 |
| 5,912,399 | A | * | 6/1999 | Yu et al. ....................... 75/351 |

FOREIGN PATENT DOCUMENTS

| EP | 0 774 315 A2 | 5/1997 |
| GB | 1 447 518 | 8/1976 |
| WO | WO 92/20481 | 11/1992 |

* cited by examiner

Primary Examiner—Ngoclan Mai
(74) Attorney, Agent, or Firm—Nixon & Vanderhye, P.C.

(57) ABSTRACT

The invention concerns a pre-alloyed metal powder consisting essentially of tungsten and/or molybdenum, at least one transition metal selected among iron, cobalt, nickel and copper, and optionally at least one additive, the iron content being less than 50 wt. % and the total additive content being less than 3 wt. %, relative to the total weight of metals, said pre-alloyed metal powder having elementary grain size measured with scanning electron microscope, greater than 200 nm and less than 5 micrometers. The invention also concerns a sintered part obtained with such a powder. The invention is particularly applicable for producing sintered parts to be used as electric contacts, heat sinks, spark machining electrodes, mechanical balance weights, inertial units, tool-holders, anti-radiation screen, armament components, sintered steel or diamond charged cutting or grinding tools or with titanium carbide.

61 Claims, No Drawings

METAL MICROPOWDERS BASED ON TUNGSTEN AND/OR MOLYBDENUM AND 3D TRANSITION METALS

The invention relates to novel metal micropowders based on tungsten and/or molybdenum and 3d transition metals.

It is known that an important branch of metallurgy is based on the production of powders which may be used in particular as pigments or in the production of sintered parts.

The metal parts used specifically are generally metal alloys. It will be recalled that metal alloys, depending on the mutual solubility characteristics of the constituent metals, may be single-phase or multiphase systems.

The production of sintered parts using a mixture of pure metal powders gives rise to difficulties when the desire is to obtain a homogeneous sintered part.

It is therefore desirable to prepare prealloyed powders, in which each particle contains the constituent metals of the alloy in the same proportions as the powder in its entirety.

In order to obtain prealloyed powders, it is possible in particular to utilize techniques of coprecipitation of metal hydroxides or salts. The coprecipitates, after drying and, optionally, grinding, are subjected to the action of a reducing agent, for example hydrogen, to give metal powders.

When it is desired to operate starting from water-soluble salts, it is possible to prepare suspensions containing the metal hydroxides or salts in the required proportions and to subject the resulting suspensions to an operation of co-spray drying. This gives particles whose composition in terms of metal hydroxides and/or salts is homogeneous. These particles may be subsequently reduced to prealloyed metal powders with the aid of a reducing agent.

It is known that the techniques of manufacturing metal powders generally lead to agglomerates consisting of a plurality of elementary grains connected to one another at points. Grinding techniques generally enable the number of individual elementary grains to be increased and the number of elementary grains present in the aggregates to be reduced.

As indicated above, the invention relates to micropowders. In the present specification, "micropowders" are powders such that the largest dimension of the elementary grains is greater than 200 nm and less than or equal to 5 micrometres. The dimensions of the elementary grains may be measured in particular under the scanning electron microscope. The micropowders must be differentiated from nanometric powders, whose elementary grains have dimensions of less than approximately 100 nm.

The invention relates to novel metal powders based on tungsten and/or molybdenum and based on at least one 3d transition metal selected from iron, cobalt, nickel and copper.

The powders of the invention possess advantageous properties in diverse applications, as will be specified in the remainder of the description.

The invention therefore provides a prealloyed metal powder consisting essentially of tungsten and/or molybdenum, at least one transition metal selected from iron, cobalt, nickel and copper, and, optionally, at least one additive, the iron content being less than 50% by weight and the total additive content being less than 3% by weight relative to the total weight of the metals, the said prealloyed metal powder having elementary grain dimensions, measured under the scanning electron microscope, of greater than 200 nm and less than 5 micrometres, with the exception of a powder consisting essentially of tungsten, iron and nickel; and a sintered part obtained with the aid of such a powder.

In the present specification, unless indicated otherwise, a powder "consisting essentially" of such and such a metal ("essential" constituents) contains each of these metals in a proportion of more than 1% by weight, and in particular of more than 3% by weight. Such a constituent, when it may be used in a proportion of less than 3%, and in particular of less than 2% or less than 1%, is then considered to be an additive to the alloys in which it is present in such low proportions.

The additives may, in practice, be any metals or metalloids which are capable of improving the properties of the powders or of the sintered parts. Within a given powder, the additives may be selected in particular from all metals which are not essential constituents (as defined above) of the powder, or the oxides of these metals.

The purpose of the presence of additives may in particular be to improve the sintering operations. It is known that the presence of an additive, even in very small amounts (for example, of the order of 0.1%), often makes it possible to reduce considerably the sintering temperature.

The selection of the additives and of their amount may be determined by means of simple, routine experiments.

In the present specification, the percentages of metals are percentages by weight, relative to the total weight of the metals of the powder.

It is known that metal powders have a tendency to undergo oxidation in air, this oxidation increasing over time and with the oxidizability of the metals present. In the powders of the invention, the total oxygen content (measured by reduction using carbon) at the exit from the oven in which the metal hydroxides and/or salts have been reduced is generally less than 2% relative to the total weight of the powder. By optimizing the operating conditions of the hydrogen reduction it is possible, if desired, to obtain markedly lower oxygen contents.

The powders of the invention may be prepared in accordance with the methods of coprecipitation and, optionally, of spray drying, followed by reduction, which have been described above and which are known per se. The selection of the temperature and of the time of reduction may be determined with the aid of simple, routine experiments, in particular by thermogravimetric analysis. It is possible to optimize the size of the elementary grains, in awareness that this size increases with temperature and with the duration of heating, during the reduction operation.

A more detailed description will now be given below of certain classes of powder which form part of the invention. Of course, the invention also relates to sintered parts obtained from such powders, and more generally to any finished industrial articles comprising these powders.

Among the powders of the invention, mention may be made in particular of (a) those consisting essentially of from 35 to 95% of tungsten and/or molybdenum, from 5 to 65% of copper, and from 0 to 3% of at least one additive; the additives may be selected in particular from iron and cobalt; each additive, if present, may represent, for example, less than 1% of the total weight of the metals of the powder.

Among these powders, mention may be made in particular of those containing from 50% to 95% of tungsten and from 5% to 50% of copper, in particular from 10 to 25% of copper.

Mention may also be made of the powders consisting essentially of from 35 to 95% of molybdenum and from 5 to 65% of copper, and in particular from 10 to 50% of copper.

The powders based on tungsten and/or molybdenum and copper may be used in particular in the production by sintering of electrical contact parts or electrical discharge machining electrodes. In particular, they possess good properties of resistance to the harmful effects of the electric arc (corrosion, oxidation).

Such powders may also be used to produce sintered parts intended for service as heat sinks (or radiators) whose function is to evacuate the heat in certain devices.

(b) those which consist essentially of from 80% to 99.5% by weight of tungsten, from 0.5% to 15% of nickel, from 0 to 10% by weight of iron, from 0 to 10% by weight of copper, and from 0 to 3% of at least one additive.

As an additive it is possible to use, in particular, cobalt, generally in a proportion not greater than 1% by weight relative to the total weight of the metals of the powder. It is also possible to use small proportions (for example from 0 to 1%) of copper, the latter in that case being considered as an additive.

Among these powders, mention may be made in particular of those containing from 90 to 95% by weight of tungsten; and in particular those which consist essentially of tungsten, nickel and iron and which may contain, for example, as additives, from 0 to 1% by weight of cobalt and/or from 0 to 1% by weight of copper.

Among these powders, mention may also be made of those consisting essentially of tungsten, nickel and copper and containing from 0 to 1% of iron and from 0 to 1% by weight of cobalt.

Powders of this kind, of high density, may be used in particular to prepare, by sintering, balance weights, inertial units, tool holders, anti-radiation screens, or else shielding elements.

(c) those consisting essentially of from 5 to 60% by weight of tungsten and/or molybdenum, from 0 to less than 50% by weight of iron, from 0 to 40% by weight of cobalt, from 0 to 80% by weight of nickel, from 0 to 50% by weight of copper, and from 0 to 3% of at least one additive.

Among these powders, mention may be made in particular of those containing from 5% to 60% by weight of tungsten and/or molybdenum, from 20% to 60% by weight of nickel and/or copper, from 20% to less than 50% by weight of iron and from 0 to 30% by weight of cobalt, and in particular those containing from 20 to 60% of nickel and optionally, as additive, from 0 to 1% of copper.

Mention may also be made, among these powders, of those consisting essentially of from 20% to 60% by weight of tungsten and/or molybdenum, from 10% to 40% by weight of cobalt and from 10% to 50% by weight of copper, and optionally iron as additive.

Powders of this kind may be used in particular in the manufacture, by sintering, of diamond tools, in place of the cobalt-based binders conventionally used.

Mention may, finally, be made of powders consisting essentially of from 15 to 40% of copper, from 50 to 80% of nickel and from 5 to 20% of molybdenum.

These powders may be mixed as an additive with iron powder, and optionally with carbon (for example graphite) in order to obtain sintered steels.

(d) those consisting essentially of from 5% to 40% by weight of tungsten and/or molybdenum, from 60% to 95% by weight of nickel, and from 0 to 35% by weight of an additive, the additive being selected for example from cobalt, iron and copper.

Mention may be made in particular of the powders containing from 5 to 30% of tungsten and/or molybdenum and in particular those consisting essentially of tungsten and nickel.

Such powders may be used as binders in the preparation, by sintering, of diamond tools. A binder of this kind improves the mechanical properties of the diamond tools.

(e) those consisting essentially of from 1 to 10% by weight of tungsten and/or molybdenum, from 20 to 80% by weight of cobalt, from 20 to 80% by weight of nickel and from 0 to 35% by weight of an additive.

Among these powders, mention may be made in particular of those consisting essentially of molybdenum, cobalt and nickel, and optionally at least one additive.

Such powders may be used in particular as binders in the preparation, by sintering, of cermets, i.e. abrasive or cutting tools containing titanium carbide.

The invention likewise relates to the use of a powder as defined above in the production of sintered parts which may be used as electrical contacts, heat sinks, electrical discharge machining electrodes, mechanical balancing weights, inertial units, tool holders, anti-radiation screens, shielding elements, sintered steels, or titanium carbide or diamond abrasive or cutting tools. The fields of application of the different categories of powders have been specified above.

Generally speaking, the powders of the invention, used to obtain sintered parts, have the advantage of enhancing the mechanical or physical properties of the parts obtained and/or the advantage of facilitating sintering by making it possible, in particular, to operate at relatively low temperatures and/or pressures and/or of improving the densification of the sintered parts.

The following examples illustrate the invention.

EXAMPLES 1 to 4

The raw materials employed are cobalt chloride $CoCl_2$, used in the form of an aqueous solution containing 170.6 g/l of cobalt; crystalline ferric chloride $FeCl_3.6H_2O$, purity 98%; crystalline nickel chloride $NiCl_2.6H_2O$, purity 97%; and crystalline cupric chloride $CuCl_2.2H_2O$, purity 96%.

By adding the metal salts to the solution of cobalt chloride, solutions are prepared which contain approximately 200 g/litre of the various metals. The metal salt solution is heated to 60° C. and poured into an aqueous solution of sodium hydroxide, which is itself heated at 60° C., with stirring. The amount of sodium hydroxide is calculated such that a 10% excess of sodium hydroxide is used relative to the stoichiometry of formation of the hydroxides from salts. Stirring is continued for 1 hour, at the temperature of 60° C. The mixture is filtered. The precipitate is washed 3 times by resuspending it in 3.5 l of water, heated at 60° C., and then filtering the suspension. The hydroxide precipitate is subsequently resuspended in water and, with stirring, ammonium metatungstate hydrate, referred to hereinafter as AMT, containing 85.98% of $WO_3$ oxide, is added in the form of an aqueous solution, with vigorous stirring.

In the manner indicated above, hydroxide suspensions containing AMT were prepared starting from the following products:

composition 1:293 cm³ of the cobalt chloride solution; 404.1 g of ferric chloride; 233.7 g of nickel chloride and 20.53 g of ammonium metatungstate (AMT);

composition 2:293 cm³ of cobalt chloride solution; 101 g of ferric chloride; 208.7 g of nickel chloride and 117.34 g of AMT;

composition 3:293 cm³ of cobalt chloride; 203.7 g of cupric chloride and 117.34 g of AMT;

composition 4:667.8 g of nickel chloride and 58.67 g of AMT.

The metal hydroxide suspensions containing AMT obtained in this way were dried and pulverized in a ray dryer.

The powders obtained were subsequently reduced an oven under a hydrogen atmosphere. The oven is divided into three zones, whose temperatures are regulated independently. The powder samples are automatically moved within the oven such that the total time of passage is 9 and a half minutes. The temperature zones were regulated at 600–700–750° C. for compositions 1 to 3 and 500 600–650° C. for composition 4.

The powders obtained after reduction have the following composition (% by weight):
Powder 1: W 9.6; Co 23.4; Fe 37.9; Ni 27.4; oxygen 1.7
Powder 2: W 39; Co 23.8; Fe 10.9; Ni 26.6; oxygen 0.5
Powder 3: W 53.8; Co 23.7; Cu 20.5; oxygen 2
Powder 4: W 24.75; Ni 74.7; oxygen 0.55

The oxygen content measured is the total oxygen.

The specific surface areas (BET) are, respectively, 5.4; 1.77; 5.25 and 2.3 m$^2$/g.

Similar results are obtained when the reduction is carried out in an oven at constant temperature: at 725° C. (powders 1 to 3) or at 625° C. (powder 4).

The powders are subsequently subjected to the action of a nitrogen jet mill so as to reduce the size of the agglomerates.

Sintering tests

Sintering is carried out using a high pressure high temperature apparatus. The matrix employed is a graphite matrix with 4 cylindrical punches. The sintered parts are slugs with a diameter of 20 mm and a thickness of 5 mm. The amount of powder required to give a sintered part having these dimensions is calculated as a function of the theoretical density. The powder sample is heated such that the sintering temperature is attained after 10 minutes. During the first 7 minutes, the pressure applied is 15 MPa. Thereafter, the pressure applied is 32.5 MPa. A temperature plateau is observed for 2 minutes, then heating is discontinued and the pressure is maintained for 1 minute more at 32.5 MPa.

The sintering temperatures were 800° C. for powder 1, 1000° C. for powder 2, 950° C. for powder 3 and 800° C. for powder 4.

EXAMPLE 5

An aqueous solution containing the chlorides of copper and of nickel is prepared by mixing 6.61 litres of a solution of cupric chloride (containing 211 g/l of copper) with 17.65 litres of a solution of nickel chloride (containing 175.9 g/l of nickel). This solution is poured with stirring into 50 litres of a sodium hydroxide solution assaying at 132 g/l and heated at 60° C., so as to cause the coprecipitation of copper and nickel hydroxides. The precipitate thus obtained is subsequently separated by filtration and then washed. The precipitate is resuspended in water, in a proportion of approximately 5 litres of water per kg of precipitate. A solution of commercial molybdic acid assaying at 113 g/l of molybdenum is added to this suspension, in a proportion of 0.35 litre of this molybdic solution per kg of precipitate. Drying in a spray dryer followed by reduction under hydrogen, and then deagglomeration in a hammer mill, gives a metal powder assaying at 0.24% oxygen, 59.7% nickel, 27.1% copper and 12.7% molybdenum. Under the scanning electron microscope, an average elementary grain size of approximately 1 μm is measured.

The commercial product called "molybdic acid" consists essentially of ammonium molybdate.

EXAMPLE 6

An aqueous solution containing the chlorides of cobalt and of nickel is prepared by mixing 14 litres of a solution of cobalt chloride containing 172 g/l of cobalt with 13.7 litres of a solution of nickel chloride containing 175.9 g/l of nickel. This solution is poured with stirring into 40 litres of a sodium hydroxide solution assaying at 187.5 g/l and heated at 60° C., so as to cause the coprecipitation of cobalt and nickel hydroxides. The precipitate thus obtained is subsequently separated by filtration and then washed. The precipitate is resuspended in water, in a proportion of approximately 5 litres of water per kg of precipitate. A solution of molybdic acid assaying at 23.1 g/l of molybdenum is added to this suspension, in a proportion of 0.7 litre of molybdic solution per kg of precipitate. Drying in a spray dryer followed by reduction under hydrogen, and deagglomeration in a hammer mill, gives a metal powder assaying at 0.37% oxygen, 47% cobalt, 47% nickel and 5.1% molybdenum. Under the scanning electron microscope, an average elementary grain size of approximately 0.5 μm is measured. The specific surface area measured by the BET method is 1.79 m$^2$/g.

This powder is subsequently compacted without heating into parallelepipedal test specimens with a relative density of approximately 60%. By means of a sintering operation in an oven under hydrogen (ascent to 1100° C. in 5hours then plateau of 1 hour at 1100° C., then cooling in approximately 12 hours), these test specimens acquire a density equal to 97.3% of the theoretical density. Under the optical microscope, the structure of a polished cross-section of the sintered part appears very fine and highly homogeneous.

EXAMPLES 7 to 10

In a similar fashion, powders were prepared containing (5% by weight):
W 93.4; Ni 4; Cu 2.4; oxygen 0.11 Average elementary grain size: 0.5 μm
W 79.9; Cu 19.9; oxygen 0.14 Average elementary grain size: 0.5 μm Specific surface area (BET): 0.73 m$^2$/g
W 79.7; Cu 19.1; Co 1.1; oxygen 0.14
Mo 88.5; Cu 10.4; oxygen 0.17 Average elementary grain size: 0.5 μm

What is claimed is:

1. Prealloyed metal powder containing tungsten and/or molybdenum, and at least one transition metal selected from iron, cobalt, nickel and copper, the iron content being less than 50% by weight, the prealloyed metal powder having elementary grain dimensions, measured under the scanning electron microscope, of greater than 200 nm and less than or equal to 5 micrometres, said powder being selected from
    a) a powder consisting essentially of from 35 to 95% of molybdenum, from 5 to 65% of copper, and from 0 to 3% of at least one additive;
    b) a powder consisting essentially of 80% to 99.5% by weight of tungsten, from 0.5% to 15% of nickel, from 0 to 10% by weight of iron, from 0 to 10% by weight of copper, and from 0 to 3% of at least one additive, in which, when said powder consists essentially or tungsten, nickel and iron, the amount or additive(s) is not zero;
    c) a powder consisting essentially of 5% to 60% by weight of tungsten and/or molybdenum, from 20% to 60% by weight of nickel and/or copper, as well as iron in an amount of less than 50% by weight, cobalt in an amount not exceeding 30%, and from 0 to 3% of at least one additive;
    d) a powder consisting essentially of from 20% to 60% by weight of tungsten and/or molybdenum, from 10% to 40% by weight of cobalt and from 10% to 50% by weight of copper, and containing optionally iron as additive;

e) a powder consisting essentially of from 1% to 40% of copper, from 50 to 80% of nickel and from 5 to 20% of molybdenum, and from 0 to 3% by weight of an additive;

f) a powder consisting essentially of from 5% to 40% by weight of tungsten, from 60% to 95% by weight of nickel, and from 0 to 3% by weight of an additive;

g) a powder consisting essentially of from 1 to 10% by weight of tungsten and/or molybdenum, from 20 to 80% by weight of cobalt, from 20 to 80% by weight of nickel and from 0 to 3% by weight of an additive;

h) a powder consisting essentially of from 35 to 95% of tungsten, from 5 to 65% of copper, from 0.1 to 3% of iron, and optionally cobalt as a further additive; and i) a powder consisting essentially of from 35 to 95% of tungsten and of molybdenum, from 5 to 65% of copper, and from 0 to 3% of at least one additive, wherein the amount of molybdenum is more than 1% by weight.

2. Powder according to claim 1 consisting essentially of from 35 to 95% of molybdenum, from 5 to 65% of copper, and from 0 to 3% of at least one additive.

3. Powder according to claim 2, in which the additives are selected from iron and cobalt.

4. Powder according to claim 3, in which each additive, if present, represents less than 1% of the total weight of the metals of the powder.

5. Powder according to claim 2, containing from 10 to 25% of copper.

6. Powder according to claim 2, consisting essentially of from 35% of 95% of molybdenum and from 5% to 65% of copper.

7. Powder according to claim 1, containing from 10% to 50% by weight of copper.

8. Powder according to claim 1, consisting essentially of 80% to 99.5% by weight of tungsten, from 0.5% to 15% of nickel, from 0 to 10% by weight of iron, from 0 to 10% by weight of copper, and from 0 to 3% of at least one additive in which, when said powder consists essentially of tungsten, nickel and iron, the amount of additive(s) is not zero.

9. Powder according to claim 8, in which the said additive is cobalt.

10. Powder according to claim 8, containing from 90 to 95% by weight of tunqsten.

11. Powder according to claim 8, consisting essentially of tungsten, nickel, iron and at least one additive.

12. Powder according to claim 8, consisting essentially of tungsten, nickel and copper and containing from 0 to 1% of iron and from 0 to 1% by weight of cobalt.

13. Powder according to claim 8, consisting essentially of from 5% to 60% by weight of tungsten and/or molybdenum, from 20% to 60% by weight of nickel and/or copper, as well as iron in an amount of less than 50% by weight, cobalt in an amount not exceeding 30% by weight, and from 0 to 3% of at least one additive.

14. Powder according to claim 13, containing from 20% to 60% of nickel.

15. Powder according to claim 13, containing iron in an amount of at least 20%.

16. Powder according to claim 14, containing copper as additive.

17. Powder according to claim 1, consisting essentially of from 20% to 60% by weight of tungsten and/or molybdenum, from 10% to 40% by weight of cobalt and from 10% to 50% by weight of copper, and containing optionally iron as additive.

18. Powder according to claim 1, consisting essentially of from 15 to 40% of copper, from 50 to 80% of nickel and from 5 to 20% of molybdenum.

19. Powder according to claim 1, consisting essentially of from 5% to 30% by weight of tungsten, from 60% to 95% by weight of nickel, and from 0 to 3% by weight of an additive.

20. Powder according to claim 19, comprising at least one additive selected from cobalt, iron and copper.

21. Powder according to claim 1, consisting essentially of from 1 to 10% by weight of tungsten and/or molybdenum, from 20 to 80% by weight of cobalt, from 20 to 80% by weight of nickel and from 0 to 3% by weight of an additive.

22. Powder according to claim 21, consisting essentially of molybdenum, cobalt and nickel, and optionally at least one additive.

23. A method of producing a sintered article comprising sintering a powder according to claim 21.

24. Sintered article obtained with the aid of a powder as defined in claim 21.

25. Powder according to claim 1 which consists essentially of from 5% to 40% by weight of tungsten, from 60% to 95% by weight of nickel, and from 0 to 3% by weight of an additive.

26. Powder according to claim 13 wherein said iron is present in an amount of more than 1% by weight.

27. Powder according to claim 13 wherein said cobalt is present in an amount of more than 1% by weight.

28. Powder according to claim 13 wherein said iron is present in an amount of more than 3% by weight.

29. Powder according to claim 13 wherein said cobalt is present in an amount of more than 3% by weight.

30. Powder according to claim 1 which consists essentially of from 35 to 95% of tungsten, from 5 to 65% of copper, from 0.1 to 3% of iron, and optionally cobalt as a further additive.

31. Powder according to claim 1 consisting essentially of from 35 to 95% of tungsten and of molybdenum, from 5 to 65% of copper, and from 0 to 3% of at least one additive, wherein the content of molybdenum is more than 1% by weight.

32. Powder according to claim 30, in which the additives are selected from iron and cobalt.

33. Powder according to claim 31, in which the additives are selected from iron and cobalt.

34. Powder according to claim 21, in which each additive, if present, represents less than 1% of the total weight of the metals of the powder.

35. Powder according to claim 33, in which each additive, if present, represents less than 1% of the total weight of the metals of the powder.

36. Powder according to claim 30, containing from 10 to 25% of copper.

37. Powder according to claim 31, containing from 10 to 25% of copper.

38. Powder according to claim 30, containing from 10% to 50% by weight of copper.

39. Powder according to claim 31, containing from 10% to 50% by weight of copper.

40. A method of producing a sintered article comprising sintering a powder according to claim 8.

41. A method of producing a sintered article comprising sintering a powder according to claim 13.

42. A method of producing a sintered article comprising sintering a powder according to claim 17.

43. A method of producing a sintered article comprising sintering a powder according to claim 18.

44. A method of producing a sintered article comprising sintering a powder according to claim 19.

45. A method of producing a sintered article comprising sintering a powder according to claim 21.

46. A method of producing a sintered article comprising sintering a powder according to claim 25.

47. A method of producing a sintered article comprising sintering a powder according to claim 30.

48. A method of producing a sintered article comprising sintering a powder according to claim 31.

49. A method of producing a sintered article comprising sintering a powder according to claim 2.

50. Sintered article obtained with the aid of a powder defined by claim 8.

51. Sintered article obtained with the aid of a powder defined by claim 13.

52. Sintered article obtained with the aid of a powder defined by claim 17.

53. Sintered article obtained with the aid of a powder defined by claim 18.

54. Sintered article obtained with the aid of a powder defined by claim 19.

55. Sintered article obtained with the aid of a powder defined by claim 21.

56. Sintered article obtained with the aid of a powder defined by claim 25.

57. Sintered article obtained with the aid of a powder defined by claim 30.

58. Sintered article obtained with the aid of a powder defined by claim 31.

59. Sintered article obtained with the aid of a powder defined by claim 2.

60. Powder according to claim 1, consisting essentially of from 5% to 40% by weight of tungsten, from 60% to 95% by weight of nickel, and from 0 to 3% by weight of an additive.

61. Powder according to claim 60, comprising at least one additive selected from cobalt, iron and copper.

* * * * *